United States Patent
Horski et al.

(10) Patent No.: US 6,174,143 B1
(45) Date of Patent: Jan. 16, 2001

(54) PUMP MOTOR HAVING SUBMERSIBLE STATOR AND ROTOR AND INSULATED WINDING SET TERMINALS

(75) Inventors: Marek Horski; Peter A. Kershaw; Jerzy Muszynski, all of London (CA)

(73) Assignee: Siemens Canada Limited, Mississauga (CA)

(*) Notice: Under 35 U.S.C. 154(b), the term of this patent shall be extended for 0 days.

(21) Appl. No.: 09/492,376

(22) Filed: Jan. 27, 2000

Related U.S. Application Data

(63) Continuation-in-part of application No. 08/961,856, filed on Oct. 31, 1997, now abandoned.

(51) Int. Cl.[7] .................................................. F04B 39/06
(52) U.S. Cl. .............................. 417/366; 417/53; 310/54; 277/919
(58) Field of Search .................... 417/366, 53, 357, 417/370; 310/54, 68 R, 71; 277/919, 910, 630

(56) References Cited

U.S. PATENT DOCUMENTS

| | | | |
|---|---|---|---|
| 2,871,791 | * 2/1959 | Litzenberg | 417/366 |
| 3,220,350 | * 11/1965 | White | 103/87 |
| 3,761,750 | * 9/1973 | Green | 310/87 |
| 4,513,214 | * 4/1985 | Dieringer | 310/71 |
| 4,574,471 | * 3/1986 | Dibbern, Jr. et al. | 29/596 |
| 4,773,829 | * 9/1988 | Vettori | 417/366 |
| 5,614,775 | * 3/1997 | Horski et al. | 310/68 R |
| 5,697,769 | * 12/1997 | Kobman et al. | 417/410.1 |
| 5,774,036 | * 6/1998 | Hrytzak et al. | 336/192 |
| 5,778,671 | * 7/1998 | Bloomquist et al. | 60/456 |
| 5,904,471 | * 5/1999 | Woollenweber et al. | 417/371 |

FOREIGN PATENT DOCUMENTS

| | | |
|---|---|---|
| 56088982 | * 7/1981 | (EP) . |
| 5071436 | * 3/1993 | (EP) . |
| 272480 | * 6/1926 | (GB) . |

* cited by examiner

*Primary Examiner*—Charles G. Freay
*Assistant Examiner*—Robert Z. Evora

(57) ABSTRACT

A brushless electric motor 26 includes a stator assembly 32 defining an interior chamber 38. The stator assembly includes a stator core 34 and windings 36. The windings and at least a portion 44 of the stator core are in open communication with the interior chamber. A rotor assembly 42 is provided in the interior chamber. An electronic control unit 60 is coupled to the stator assembly and has an upper surface 62 in communication with the interior chamber. A fluid flow path structure 64 is constructed and arranged to permit fluid to pass from an inlet in the stator assembly and enter the interior chamber so that the rotor assembly, the windings, and the portion of said stator core are submerged in the fluid for cooling the rotor assembly, the windings, and the portion of the stator core. Fluid also contacts the upper surface of the electronic control unit to cool the electronic control unit. Fluid isolating structure 74' prevents fluid from contacting an end 81 of the windings.

25 Claims, 2 Drawing Sheets

PUMP MOTOR HAVING SUBMERSIBLE STATOR AND ROTOR AND INSULATED WINDING SET TERMINALS

This is a continuation-in-part of U.S. application Ser. No. 08/961,856, filed on Oct. 31, 1997 now abandoned.

FIELD OF THE INVENTION

The present invention relates to a pump motor having a rotary pump for water or other liquids and an electric motor for driving the pump, which has fluid flow path structure permitting the rotor and stator to be submerged in fluid.

BACKGROUND OF THE INVENTION

Water pump motors typically include a rotor assembly mounted in a rotor chamber and a stator assembly, having laminations and a winding set, operatively associated with the rotor assembly. The rotor assembly shares a bearing-supported shaft with an impeller of the pump. Water pump motors generally have some type of cooling to extend the operating capability thereof. In general, it is desirable to maintain the temperature of such devices below a predetermined limit in order to prevent deterioration of the device through thermal breakdown or distortion due to thermal expansion of elements of the device. In certain pump motors, the stator assembly and rotor assembly may be in fluid contact to cool the same, and the bearings may be in heat exchange relation with the fluid.

Water pump motors for use in todays automobiles are electronically controlled and generally have an electronic control unit electrically coupled to the winding set of the motor. The electronic control unit generates heat that may limit the operating temperature of the pump motor. Thus, there is a need to provide cooling not only of the bearings, rotor assembly and stator assembly of the device, but also of the electronic control unit thereof.

SUMMARY OF THE INVENTION

An object of the present invention is to fulfill the need referred to above. In accordance with the principles of the present invention, this objective is obtained by providing a brushless electric motor including a stator assembly defining an interior chamber. The stator assembly includes a stator core and windings. The windings and at least a portion of the stator core are in open communication with the interior chamber. A rotor assembly is provided in the interior chamber. An electronic control unit is coupled to the stator assembly and has an upper surface in communication with the interior chamber. A fluid flow path structure is constructed and arranged to permit fluid to pass from an inlet in the stator assembly and enter the interior chamber so that the rotor assembly, the windings, and the portion of said stator core are submerged in the fluid for cooling the rotor assembly, the windings, and the portion of the stator core. Fluid also contacts the upper surface of the electronic control unit to cool the electronic control unit. Fluid isolating structure prevents fluid from contacting an end of the windings.

In accordance with another aspect of the invention, a method of isolating an end of a winding of a motor is provided. The motor has a stator assembly including a stator core and a winding which has a winding end. A rotor assembly is mounted for rotation with respect to the stator core. An electronic control unit is coupled to the stator assembly. The winding, the rotor assembly, a surface of the electronic control unit, and at least a portion of the stator core are constructed and arranged to be submerged in fluid. The method includes:

providing gasket material between the stator assembly and the electronic control unit; and passing the winding end through the gasket material so as to prevent fluid from contacting the winding end when the winding, the rotor assembly, the surface of the electronic control unit, and the portion of the stator core are submerged in fluid.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawing, all of which form a part of this specification.

DETAILED DESCRIPTION OF THE PRESENTLY PREFERRED EXEMPLARY EMBODIMENTS

Figure 1:
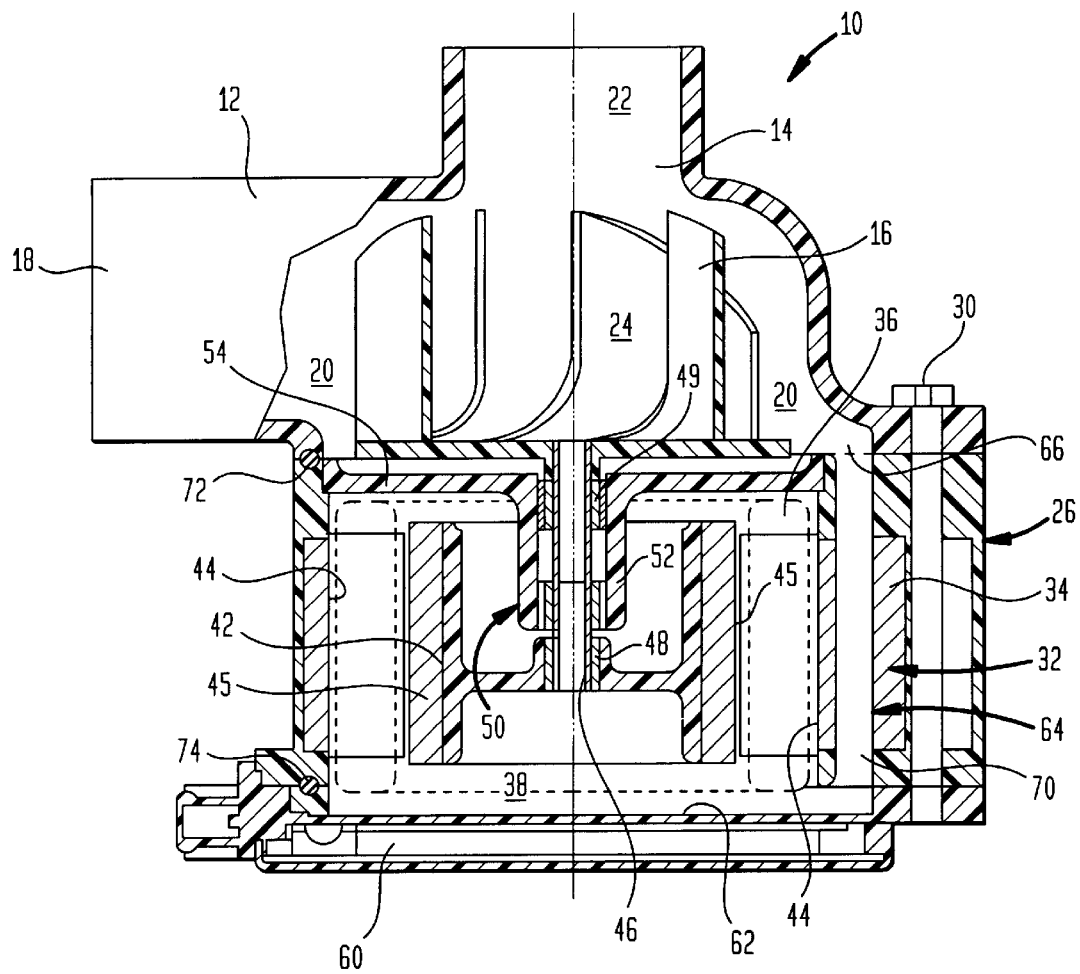
FIG. 1 is a sectional view of a water pump motor provided in accordance with the principles of the present invention.

Referring to FIG. 1, a brushless d.c. water pump motor is shown generally indicated at 10, which embodies the principles of the present invention.

The water pump motor 10 includes a pump housing 12 defining an impeller chamber 14. An impeller 16 is disposed in the impeller chamber 14. The pump housing and impeller may be of any conventional type having an exit 18 at an outer or high pressure portion 20 of the impeller chamber 14, and an inlet 22 at a low pressure portion 24 of the impeller chamber 14.

A motor assembly, generally indicated at 26, is coupled to the pump housing 12 via bolting 30. The motor assembly 26 includes a stator assembly, generally indicated at 32, having the conventional laminations or stator core 34 and windings 36. The stator assembly 32 defines a generally cylindrical interior chamber 38 and a rotor assembly 42 is disposed in the interior chamber 38. As shown in the FIG. 1, the windings 36 and a portion 44 of the laminations 34 or stator core are in open fluid communication with the interior chamber 38. The rotor assembly 42 has the conventional magnets 45 mounted on the outer peripheral portion thereof.

A shaft 46 is provided on which the rotor assembly 42 and impeller 16 are mounted. The shaft 46 is hollow and thus fluidly communicates the interior chamber 38 with the impeller chamber 14 via passage 47 therethrough. The shaft 46 is mounted for rotation via bearing 48 and bearing 49 that are operatively associated with the shaft 46 for supporting the hollow shaft 46 for rotational movement. Bearings 48 and 49 are housed in a bearing housing, generally indicated at 50, which includes a boss portion 52, and a generally disk-shaped portion 54 which is coupled to the stator assembly 32.

An electronic control unit 60 containing the circuitry to operate the water pump motor 10 is coupled to the motor assembly 26 (in particular, to the stator assembly 32) and has an upper surface 62 in communication with the interior chamber 38. Surface 62 may be part of a heat sink of the electronic control unit 60.

In accordance with the principles of the invention, fluid flow path structure, generally indicated at 64, is provided to permit fluid to pass from the high pressure portion 20 of the impeller chamber 14 to an inlet 66 of the motor assembly 26 and enter the interior chamber 38 so that the rotor assembly 42, windings 36 and portion 44 of the stator core may be submerged in fluid and fluid may contact the upper surface 62 of the electronic control unit 60 to cool those assemblies. Further, the fluid may enter the hollow shaft 46 and be in heat transfer relation therewith to cool the bearings 48 and 49.

In the embodiment of FIG. 1, the fluid flow path structure 64 includes a plurality of passages 70 through the stator assembly 32 and in particular through laminations 34 so as to be in fluid communication with interior chamber 38. As shown, passages 70 also communicate with the upper surface 62 of the electronic control unit 60. With reference to the arrows in FIG. 1, fluid may flow from the high pressure portion 20 of the impeller chamber 14 through the inlet 66 of the motor assembly 26 and through the passages 70 in the stator assembly 32 and into the interior chamber 38. As a result, the rotor assembly 40, windings 36 and portion 44 of the stator core 34 are submerged in the fluid and fluid contacts the upper surface 62 of the electronic control unit 60 to cool the same. The laminations 34 are also cooled by the fluid flowing through passages 70 in the stator assembly 32. Fluid may pass through the passage 47 (fluid return structure) in the hollow shaft 46 and thus return fluid to the low pressure portion 24 of the impeller chamber 14.

As shown in FIG. 1, a gasket 72 provides a seal between the pump housing 12 and the motor assembly 26 and a gasket 74 provides a seal between the stator assembly 32 and the electronic control unit 60.

Thus, it can be seen that the rotor assembly, laminations, windings, bearing structure and the electronic control unit are cooled effectively by the circulating fluid.

Figure 2:
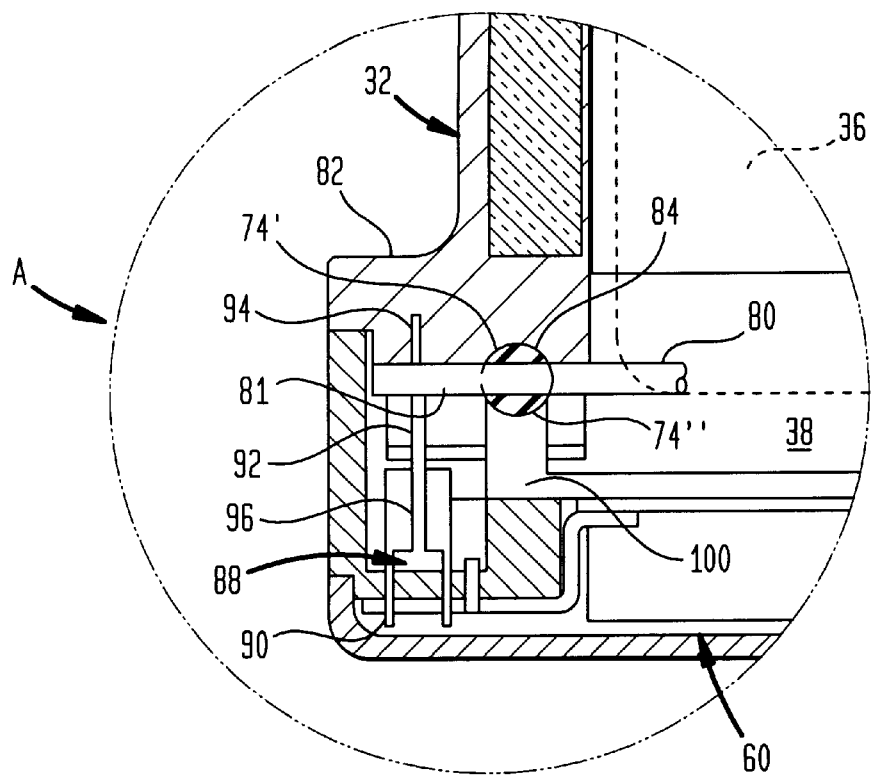
FIG. 2 is an enlarged view of a winding set connection of the water pump motor of FIG. 1.

FIG. 2 is an enlarged view of a winding set connection for the pump motor of FIG. 1.

In order to isolate the winding terminals from cooling fluid in chamber 38 of the stator assembly 32, the end portion 80 of the windings 36 is passed between a fluid isolating structure in the form of an elastomer gasket material 74' which seals the stator assembly 32 with the electronic control unit 60. Thus, cooling fluid is prevented from passing from chamber 38 to winding end 81. The gasket material 74' is preferably silicone material that is applied directly to a gasket channel 84 defined in the stator assembly 32. The gasket material 74' may be applied either manually or by a robotic dispensing system into the gasket channel 84. In the preferred embodiment, the gasket material 74' is applied without the electronic control unit 60 being attached to the stator assembly 32. This is done by providing the gasket material in the gasket channel 84 and passing the winding end 81 therethrough in a molding process so as to surround the wire. Surface tension helps maintain the position of portion 74" of the gasket material 74'. Thus, portion 74" of the gasket material 74' is free-formed. The gasket material 74' is then cured preferably by UV light to form a compressible gasket. Other elastomers may be used as the gasket material 74' which are capable of isolating the fluid from winding end 81.

Figure 3:
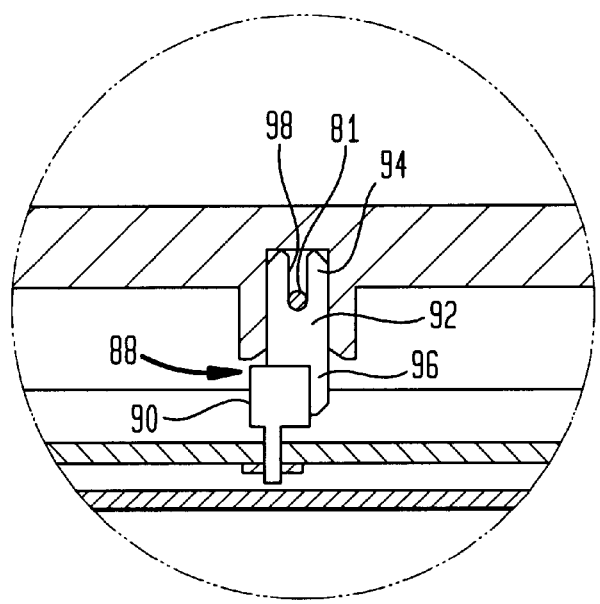
FIG. 3 is a sectional view taken in the direction of the arrow A of FIG. 2.

In addition, an electrical connection, generally indicated at 88, is provided which joins winding end 81 to a printed circuit board socket 90. This connection 88 is achieved via a tab 92 engaged at one end 94 with winding end 81 and, at the other end 96 thereof, to the socket 90. As best shown in FIG. 3, end 94 of tab 92 is embedded in housing 82 and is a generally U-shaped or V-shaped having serrations 98 which engage the winding end 81 when the winding end 81 is passed therethrough. When the electronic control unit 60 is coupled to the stator assembly, a heat sink portion 100 of the electronic control unit 60 engages portion 74" of the gasket material 74'. In addition, the end 96 of the tab 92 is removably engaged with the socket 90. This arrangement isolates the winding terminals from cooling fluid in chamber 38 of the stator assembly 32 yet advantageously permits the electronic control unit 60, upon failure thereof, to be removed from the stator assembly 32 without upsetting or destroying the gasket material 74' and thus the seal surrounding the winding end 81. This permits another electronic control unit 60 to be coupled to stator assembly 32.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A brushless electric motor comprising:

a stator assembly defining an interior chamber, said stator assembly including a stator core and windings, said windings and at least a portion of said stator core being in open communication with said interior chamber, a rotor assembly in said interior chamber, an electronic control unit coupled to said stator assembly and having an upper surface in communication with said interior chamber, a fluid flow path structure constructed and arranged to permit fluid to pass from an inlet in said stator assembly and enter said interior chamber so that said rotor assembly, said windings, and said portion of said stator core are submerged in the fluid for cooling said rotor assembly, said windings, and said portion of said stator core, and fluid contacts said upper surface of said electronic control unit to cool the electronic control unit, and a fluid isolating structure preventing fluid from contacting a winding end of said windings.

2. The motor according to claim 1, wherein said fluid isolating structure comprises a gasket material provided between said stator assembly and said electronic control unit, said winding end passing through said gasket material such that said winding end is isolated from the fluid.

3. The motor according to clam 1, wherein said gasket material is silicone.

4. The motor according to claim 1, wherein said silicone is UV light curable.

5. The motor according to claim 2, wherein said gasket material is disposed in a gasket channel defined in said stator assembly.

6. The motor according to claim 2, further including a tab having one end coupled to said winding end and another end removably coupled to a circuit board socket of the electronic control unit thereby electrically coupling said winding end to said socket.

7. The motor according to claim 6, wherein said electronic control unit and said fluid isolating structure are constructed and arranged such that said electronic control unit may be removed from said stator assembly without destroying said fluid isolating structure.

8. The motor according to claim 6, wherein said tab has serrations which engage said winding end.

9. A brushless pump motor comprising:
a pump housing having an impeller chamber,
an impeller in said impeller chamber,
a motor assembly coupled to said pump housing, said motor assembly including:
a stator assembly defining an interior chamber, said stator assembly including a stator core and windings, said windings and at least a portion of said stator core being in open communication with said interior chamber,
a rotor assembly in said interior chamber,
a shaft on which said rotor assembly and impeller are mounted, said shaft including a hollow portion in open communication with said interior chamber, and
bearing structure for supporting said shaft for rotational movement,
an electronic control unit coupled to said stator assembly and having an upper surface in communication with said interior chamber,
a fluid flow path structure constructed and arranged to permit fluid to pass from a high pressure portion of said impeller chamber and enter said interior chamber so that said rotor assembly, said windings, and said portion of said stator core is submerged in the fluid for cooling said rotor assembly, said windings, and said portion of said stator core, and fluid contacts said upper surface of said electronic control unit to cool the electronic control unit, and fluid enters said hollow portion of said shaft to cool said bearing structure,
fluid return structure permitting fluid in said interior chamber to move to a low pressure portion of said impeller chamber, and
fluid isolating structure preventing fluid from contacting a winding end of said windings.

10. The pump motor according to claim 9, wherein said fluid isolating structure comprises a gasket material provided between said stator assembly and said electronic control unit, said winding end passing through said gasket material such that said winding end is isolated from the fluid.

11. The pump motor according to claim 10, wherein said gasket material is silicone.

12. The pump motor according to claim 11, wherein said silicone is UV light curable.

13. The pump motor according to claim 10, wherein said gasket material is disposed in a gasket channel defined in said stator assembly.

14. The pump motor according to claim 9, further including a tab having one end coupled to said winding end and another end removably coupled to a circuit board socket of the electronic control unit thereby electrically coupling said winding end to said socket.

15. The pump motor according to claim 9, wherein said electronic control unit and said fluid isolating structure are constructed and arranged such that said electronic control unit may be removed from said stator assembly without destroying said fluid isolating structure.

16. The pump motor according to claim 14, wherein said tab has serrations which engage said winding end.

17. The pump motor according to claim 9, wherein said hollow portion of said shaft is in open communication with said low pressure portion of said impeller chamber thereby defining said fluid return structure.

18. The pump motor according to claim 17, wherein said flow path structure includes at least one passage through said stator assembly that is in communication with said upper surface of said electronic control unit and with said interior chamber,
whereby fluid flows from the high pressure portion of the impeller chamber and through said passage into contact with the upper surface of said electronic control unit, and into said interior chamber and fluid passes through said hollow portion of said shaft and to said low pressure portion of said impeller chamber.

19. The pump motor according to claim 18, wherein said at least one passage through said stator assembly passes through laminations of said stator assembly.

20. The pump motor according to claim 9, further including an o-ring sealing a connection of said motor assembly and said impeller housing.

21. A method of cooling a pump motor, the pump motor including a pump housing having an impeller chamber with an impeller in said impeller chamber; a motor assembly coupled to said pump housing, said motor assembly being brushless and including: a stator assembly defining an interior chamber, said stator assembly including a stator core and windings, said windings and at least a portion of said stator core being in open communication with said interior chamber, a rotor assembly in said interior chamber, a shaft on which said rotor assembly and said impeller are mounted, said shaft including a hollow portion in open communication with said interior chamber, bearing structure for supporting said shaft for rotational movement, an electronic control unit coupled to said stator assembly and having an upper surface in communication with said interior chamber, fluid flow path structure constructed and arranged to permit fluid to pass from a high pressure portion of said impeller chamber to said interior chamber, and fluid return structure permitting fluid in said interior chamber to move from said interior chamber to a low pressure portion of said impeller chamber,
the method including:
permitting fluid to flow from the high pressure portion of said impeller chamber through said flow path structure to said interior chamber such that said rotor assembly, said windings and said portion of said stator core are submerged in the fluid and fluid contacts said upper surface of the electronic control unit to cool the electronic control unit,
permitting fluid to pass to said hollow portion of said shaft to cool said bearing structure,
permitting fluid in said interior chamber to pass through said fluid return structure and to the low pressure portion of said impeller chamber, and
preventing fluid in said interior chamber from contacting an end of said windings.

22. The method according to claim 21, wherein fluid is prevented from contacting the end of the windings by providing a gasket material between said stator assembly and said electronic control unit, said end of said windings passing through said gasket material.

23. A method of isolating an end of a winding of a motor, the motor having a stator assembly including a stator core and a winding, said winding having a winding end; a rotor assembly mounted for rotation with respect to said stator core; and an electronic control unit coupled to said stator assembly, said winding, said rotor assembly, a surface of said electronic control unit, and at least a portion of said stator core being constructed and arranged to be submerged in fluid, the method including:
providing gasket material between said stator assembly and said electronic control unit; and passing said winding end through said gasket material so as to prevent fluid from contacting said winding end when said winding, said rotor assembly, the surface of said electronic control unit, and the portion of said stator core are submerged in fluid.

24. The method according to claim 23, wherein said gasket material is silicone provided in a gasket channel and then cured with ultraviolet light, said winding end being molded in said silicone.

25. A method of assembling an electronic control unit to a stator assembly of a motor while isolating an end of a winding of the motor from fluid, the stator assembly including a stator core and a winding, said winding having a winding end; a rotor assembly mounted for rotation with respect to said stator core; said rotor assembly, a surface of said electronic control unit, and at least a portion of said stator core being constructed and arranged to be submerged in fluid, and said electronic control unit including a circuit board socket, the method including:

providing a gasket channel in said stator assembly, providing gasket material in said gasket channel, passing said winding end through said gasket material so as to surround a portion of the winding end, connecting said winding end to a tab to define a winding end-tab connection, curing said gasket material, removably coupling said electronic control unit to said stator assembly so that a portion of said electronic control unit engages said gasket material with said gasket material being compressed between said portion of said electronic control unit and said gasket channel to prevent said fluid from contacting the winding end-tab connection, and connecting said tab to said socket in a removable manner to provide an electrical connection between said winding end and said socket.

* * * * *